(12) United States Patent
Huang et al.

(10) Patent No.: US 8,141,051 B2
(45) Date of Patent: Mar. 20, 2012

(54) METHODS AND APPARATUS TO COLLECT RUNTIME TRACE DATA ASSOCIATED WITH APPLICATION PERFORMANCE

(75) Inventors: Eric Jian Huang, Eden Prairie, MN (US); Hu Chen, Beijing (CN); Wenguang Chen, Beijing (CN); Robert Kuhn, White Heath, IL (US)

(73) Assignee: Intel Corporation, Santa Clara, CA (US)

( * ) Notice: Subject to any disclaimer, the term of this patent is extended or adjusted under 35 U.S.C. 154(b) by 1315 days.

(21) Appl. No.: 11/618,350

(22) Filed: Dec. 29, 2006

(65) Prior Publication Data

US 2008/0162272 A1 Jul. 3, 2008

(51) Int. Cl.
*G06F 9/44* (2006.01)
(52) U.S. Cl. .................................. 717/127; 717/128
(58) Field of Classification Search ................ None
See application file for complete search history.

(56) References Cited

U.S. PATENT DOCUMENTS

| | | | |
|---|---|---|---|
| 5,450,349 A * | 9/1995 | Brown et al. | 714/27 |
| 6,338,159 B1 * | 1/2002 | Alexander et al. | 717/128 |
| 6,470,492 B2 * | 10/2002 | Bala et al. | 717/128 |
| 6,728,949 B1 * | 4/2004 | Bryant et al. | 717/127 |
| 6,728,955 B1 * | 4/2004 | Berry et al. | 717/158 |
| 6,785,801 B2 * | 8/2004 | Duesterwald et al. | 712/209 |
| 6,792,460 B2 * | 9/2004 | Oulu et al. | 709/224 |
| 6,836,881 B2 * | 12/2004 | Beynon et al. | 717/128 |
| 6,850,920 B2 | 2/2005 | Vetter | |
| 6,901,582 B1 * | 5/2005 | Harrison | 717/127 |
| 7,007,269 B2 * | 2/2006 | Sluiman et al. | 717/130 |
| 7,086,064 B1 * | 8/2006 | Stevens | 719/310 |
| 7,096,249 B2 | 8/2006 | Rajic et al. | |
| 7,228,534 B2 * | 6/2007 | Eruhimov et al. | 717/151 |
| 7,369,954 B2 * | 5/2008 | Levine et al. | 702/79 |
| 7,421,681 B2 * | 9/2008 | DeWitt et al. | 717/128 |
| 7,644,142 B2 | 1/2010 | Chen et al. | |
| 2001/0042172 A1 * | 11/2001 | Duesterwald et al. | 711/125 |
| 2002/0049801 A1 * | 4/2002 | Beynon et al. | 709/102 |
| 2002/0066081 A1 * | 5/2002 | Duesterwald et al. | 717/128 |
| 2002/0087949 A1 * | 7/2002 | Golender et al. | 717/124 |
| 2004/0068560 A1 * | 4/2004 | Oulu et al. | 709/224 |
| 2004/0210877 A1 * | 10/2004 | Sluiman et al. | 717/130 |
| 2006/0212242 A1 * | 9/2006 | Levine et al. | 702/79 |
| 2008/0127120 A1 * | 5/2008 | Kosche et al. | 717/131 |

(Continued)

OTHER PUBLICATIONS

Howard Chen, Wei-Ching Hsu, Jiwei Lu, Pen-Chug Yew, Dong-Yuan Chen, "Dynamic Trace Selection Using Performance Monitoring Hardware Sampling" IEEE 2003. pp. 79-90.*

(Continued)

*Primary Examiner* — Tuan Dam
*Assistant Examiner* — Samuel Hayim
(74) *Attorney, Agent, or Firm* — Hanley, Flight and Zimmerman, LLC

(57) ABSTRACT

Methods, apparatus, and articles of manufacture to perform runtime trace filtering associated with application performance analysis are disclosed. A disclosed example method involves generating a first performance value based on first performance data associated with a first function of a first application process. A difference value is generated based on the first performance value and a historical performance value associated with the first function. The difference value is compared to a threshold value, and first trace data associated with execution of the first application process is collected based on the comparison of the difference value to the threshold value.

26 Claims, 5 Drawing Sheets

U.S. PATENT DOCUMENTS

2008/0155339 A1* 6/2008 Lowe et al. ............ 714/38

OTHER PUBLICATIONS

Rabenseifner, Rolf, "The Controlled Logical Clock—a Global Time for Trace Based Software Monitoring of Parallel Applications in Workstation Clusters," Computing Center University of Stuttgart, Stuttgart, Institute of Electrical and Electronics Engineers (IEEE), Germany, 1996 (8 pages).

Lamport, Leslie, "Time, Clocks, and the Ordering of Events in a Distributed System," Massachusetts Computer Associates, Inc., Communication of the ACM, vol. 21, No. 7, Jul. 1978 (8 pages).

Garg et al., "Time and State in Distributed Systems," Wiley Encyclopedia on Parallel and Distributed Computing, edited by B. Wah, 2004 (9 pages).

NTP, "NTP: The Network Time Protocol," www.ntp.org, Oct. 4, 2006 (1 page).

Vetter et al., "Asserting Performance Expectations," Proceedings on Supercomputing, IEEE, Nov. 16, 2002 (13 pages).

Vetter, Jeffrey, "Performance Analysis of Distributed Applications Using Automatic Classification of Communication Inefficiencies," Proc. ACM Int'l Conf. Supercomputing (ICS), Nov. 1, 1999 (10 pages).

Mirgorodskiy et al., "Autonomous Analysis of Interactive Systems with Self-Propelled Instrumentation," Computer Sciences Dept., University of Wisconsin, Madison, USA, Jul. 19, 2004 (15 pages)

Miller et al., "The Paradyn Parallel Performance Measurement Tool,"Institute of Electrical and Electronics Engineers (IEEE), Nov. 1995 (10 pages).

Vetter, Jeffrey, "Dynamic Statistical Profiling of Communication Activity in Distributed Applications," Proc. ACM Sigmetrics: Joint International Conference on Measurement and Modeling of Computer Systems, ACM, 2002 (11 pages).

Mirgorodskiy, Alexander Vladimirovich, "Automated Problem Diagnosis in Distributed Systems," Chapter 3, pp. 51-52, Chapter 6, Ph.D. dissertation, University of Wisconsin-Madison, Apr. 17, 2006 (55 pages).

Intel GMBH, "Intel Trace Collector User's Guide," Intel, Bruhl, Germany, Jul. 21, 2005 (124 pages).

Maillet et al., "On Efficiently Implementing Global Time for Performance Evaluation on Multiprocessor Systems," Journal of Parallel and Distributed Computing, Jul. 1995 (10 pages).

Yu et al., "Event Chain Clocks for Performance Debugging in Parallel and Distributed Systems," Department of Computer Science and Technology, Tsinghua University, China, Dec. 13, 2004 (5 pages).

Christian, Flaviu, "Probabilistic Clock Synchronization," Distributed Computing, IEEE Transactions on Parallel and Distributed Systems, 1989 (13 pages).

Mirgorodskiy et al., "Problem Diagnosis in Large-Scale Computing Environments," Computer Sciences Dept., University of Wisconsin, Madison, USA, Apr. 17, 2006 (13 pages).

Mirgorodskiy et al., "Diagnosing Distributed Systems with Self-Propelled Instrumentation," Computer Sciences Dept., University of Wisconsin, Madison, USA, Mar. 22, 2007 (15 pages).

Fahringer et al., "Automatic Search for Performance Problems in Parallel and Distributed Programs by Using Multi Experiment Analysis," Proc. Intl Conf. on High Performance Computing (HiPC 2002), Dec., 2002 (9 pages).

"Intel Software Development Products for Intel Platforms and Technologies—Intel Trace Collector," Product Brief, Intel Corporation, 2004 (2 pages).

* cited by examiner

METHODS AND APPARATUS TO COLLECT RUNTIME TRACE DATA ASSOCIATED WITH APPLICATION PERFORMANCE

FIELD OF THE DISCLOSURE

The present disclosure relates generally to processor systems and, more particularly, to methods and apparatus to collect runtime trace data associated with application performance.

BACKGROUND

Software development often involves runtime performance monitoring or testing to determine whether improvements can be or should be made to software. Execution behaviors or performance characteristics are often exhibited differently when applications are fully executed than when the applications are stepped through line-by-line during a programming phase. To enable monitoring software segments (e.g., functions, processes, etc.) during runtime, performance monitoring and/or testing often involves using a trace data collector to collect trace data associated with real-time execution of processes or functions. A trace data collector is a process that typically runs in parallel with an application to be monitored and collects the trace data corresponding to executed processes or functions of the application. Trace data includes information associated with execution behavior or performance of the processes or functions, which can be stored in a data structure or file and can be subsequently analyzed by a programmer and/or an analyzer application to determine whether software changes can or should be made to the application or to portions of the application.

DETAILED DESCRIPTION

Figure 1:
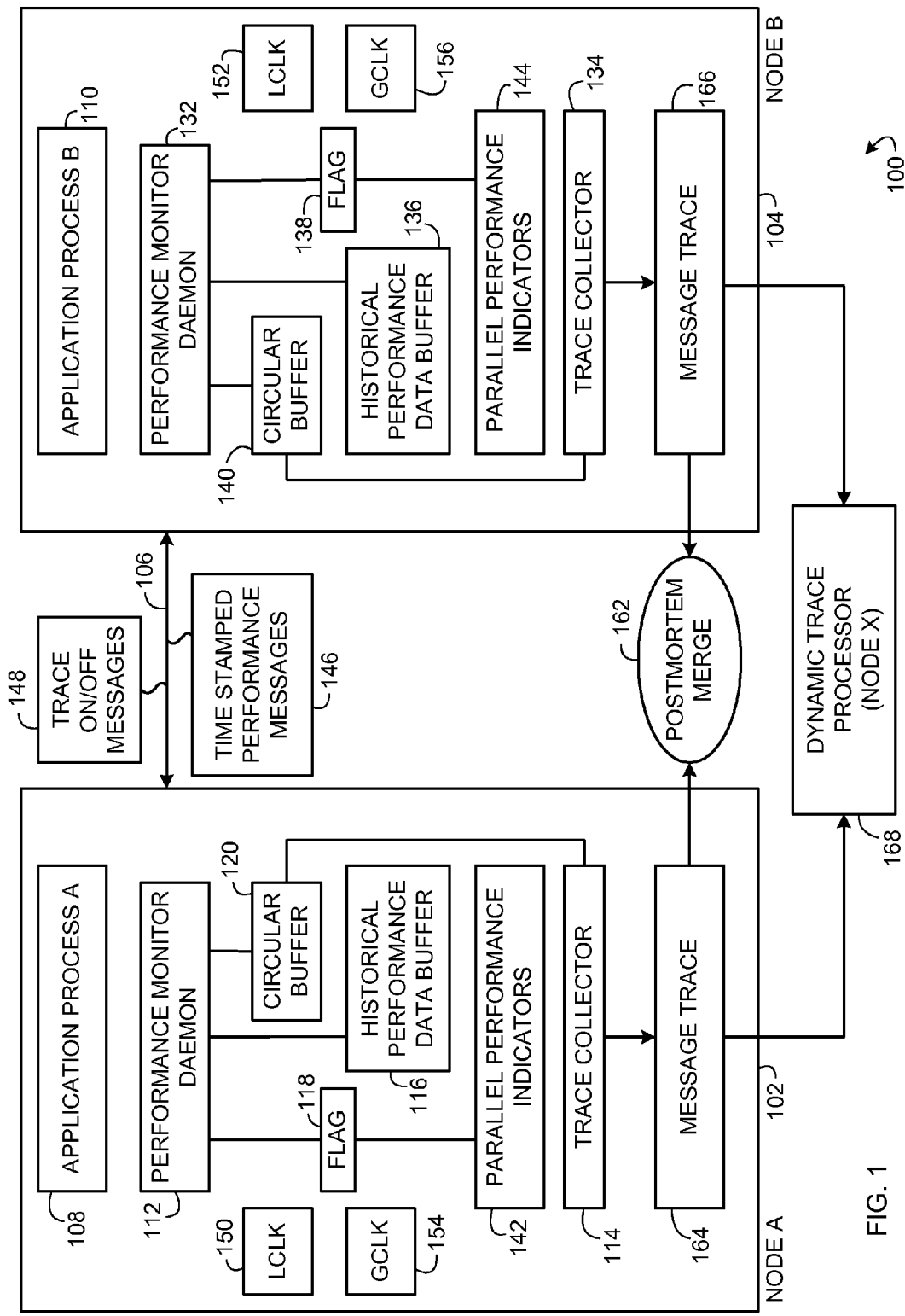
FIG. 1 depicts an example system configured to collect runtime trace data associated with application performance.

The example methods and apparatus described herein may be used to collect runtime trace data associated with application performance. In particular, the example methods and apparatus described herein may be used to selectively collect trace data associated with execution of an application (e.g., a software or application process) based on deviations or differences in performance between a recent execution performance indicator of the application and a historical execution performance indicator of the application.

The example methods and apparatus described herein are configured to determine a historical execution performance criteria value (i.e., a historical performance criteria value) and a recent execution performance criteria value (i.e., a recent performance criteria value) for each of a plurality of functions associated with executing the application. The historical performance criteria value for each function is indicative of the performance (e.g., the average performance) of that function over a plurality of executions (e.g., a plurality of loops) of the function. The recent performance criteria value for each function is indicative of the performance of that function during the most recent execution of the function. For each function, a corresponding recent performance criteria value is calculated based on performance data collected during the recent execution of that function. Also, for each function, a corresponding historical performance criteria value can be calculated by averaging a recent performance criteria value of the function with a historical performance criteria value associated with prior executions of the function. In addition to or instead of averaging, the historical performance criteria value can be calculated using any other statistical processing techniques including, for example, determining a geometric mean of the recent performance criteria value and a previously calculated historical performance criteria value.

The example methods and apparatus described herein are configured to use an adaptive data collection scheme to collect trace data associated with the execution of an application. That is, the example methods and apparatus can be used to collect trace data only when certain predetermined (e.g., user-specified) performance criteria thresholds are exceeded. A user may set one or more performance criteria thresholds during a configuration phase. Example criteria include cycles per instruction (CPI), memory bandwidth utilization, cache miss rate (e.g., L2 cache miss rate), rate of context switches (e.g., operating system context switches), etc. In some example implementations, an application may be divided into a plurality of software segments (e.g., functions, routines, processes, etc.). A software segment may contain one or more functions or processes. Each software segment may be assigned one or more performance criteria thresholds. In this manner, the example methods and apparatus can perform adaptive collection of trace data for each application segment. During a runtime phase, to determine when an application segment has exceeded a performance criteria threshold, the example methods and apparatus determine a difference between a recent and a historical performance criteria value associated with the segment to determine a difference or a standard deviation value. The difference value is then compared to a corresponding maximum performance criteria variability threshold (and/or a minimum performance criteria variability threshold) of the application segment. The example methods and apparatus are configured to collect trace data associated with the execution of the application and store the same for subsequent analysis when the difference value is greater than the maximum performance criteria variability threshold (or less than the minimum performance criteria variability threshold).

In some example implementations, the example methods and apparatus described herein can be configured to collect trace data based on differences between recent performance criteria values and user-specified or compiler-specified performance criteria values. That is, instead of using historical performance criteria values indicative of a historical execution performance of a function or software segment, a user or a compiler may specify performance criteria values that trigger collection of trace data if the difference between a recent performance criteria value and a corresponding user-specified or compiler-specified performance criteria value exceeds a maximum threshold value (or is less than a minimum threshold value). For example, during a compilation process, a compiler may determine that a particular sequence of instructions are likely to require relatively more processor resources than other instruction sequences because of, for example, the quantity of floating-point instructions in the particular sequence. To monitor the performance of a process during execution of the identified sequence of instructions, the compiler may provide a compiler-specified performance criteria value indicating that no more than seventy percent of a processor load during execution of that sequence of instruction should be due to executing the floating-point instruction. In this manner, trace data collection will be triggered during execution if a recent performance criteria value corresponding to that sequence of instructions indicates that floating-point instruction executions are creating a processor load greater than seventy percent.

In other example implementations, in addition to or instead of using user-specified performance criteria values, compiler-specified performance criteria values, and/or historical performance criteria values, the example methods and apparatus described herein may additionally or alternatively be configured to collect trace data based on performance criteria associated with hardware performance and/or operating system performance. For example, some operating systems and some hardware are configured to share runtime performance information for use by, for example, performance monitors (e.g., trace data collection applications). The operating system runtime performance information may include, for example, page file usage, memory utilization, processor resource utilization, etc. The hardware performance information may include, for example, bus usage information, processor/circuit board temperature, network interface utilization, etc.

The example methods and apparatus are preferably, but not necessarily, used in connection with a multiprocessor system network (e.g., a cluster) in which each of a plurality of network nodes (e.g., a plurality of processor systems communicatively coupled to each other via a network) executes a portion or a process of a distributed application. As used herein, a distributed application is an application having a plurality of processes that are executed by a plurality of networked nodes. During execution of the distributed application, the network nodes communicate messages to each other indicating the execution status of their respective application processes. When a network node determines that another network node exhibits an abnormality or a substantial difference in performance relative to its own performance, the network node broadcasts a message to all other network nodes requesting the nodes to collect trace data associated with the execution of their respective application processes. The trace data can then be subsequently analyzed.

FIG. 1 depicts an example system 100 configured to collect runtime trace data associated with application performance. In the illustrated example, the example system 100 includes a network node A 102 communicatively coupled to a network node B 104 via a network 106. Each of the nodes 102 and 104 may be implemented using, for example, a processor system such as the example processor system 410 of FIG. 4. In the illustrated example, the node A 102 executes an application process A 108 and the node B 104 executes an application process B 110. In the illustrated example, execution of the processes 108 and 110 collectively implements a distributed application.

Each of the network nodes 102 and 104 is provided with a plurality of elements represented in FIG. 1 by blocks that are configured to monitor performance of the processes 108 and 110 and selectively collect trace data associated with the execution of the processes 108 and 110 based on the monitored performance. For purposes of discussion, in general, only the blocks of the network node A 102 will be described in detail. In the illustrated example, blocks in the network node B 104 corresponding to the blocks of the network node A 102 are substantially similar or identical to the blocks of the network node A 102.

To collect performance data, generate historical and recent performance criteria values, and monitor performance based on threshold values associated with execution of the process A 108, the node A 102 is provided with a performance monitor 112 (e.g., a performance monitor daemon). To collect trace data, the node A 102 is provided with a trace collector 114. The trace collector 114 may be implemented using, for example, the Intel® Trace Collector manufactured and sold by Intel Corporation of Santa Clara, Calif. In the illustrated example, the performance monitor 112 and the trace collector 114 are configured to collect respective data associated with the execution of each of a plurality of software segments (e.g., functions, subroutines, etc.) associated with the process A 108. In the illustrated example, the performance monitor 112 is configured to generate and/or update one or more historical performance criteria values for each function representative of the overall (e.g., average) performance of a plurality of historical executions of that function and one or more recent performance criteria values representative of the performance for the most recent execution of the function. The performance monitor 112 stores the historical performance criteria values associated with the process A 108 in a historical performance data buffer 116.

In the illustrated example, the performance monitor 112 collects performance data and the trace collector 114 collects trace data during relatively short, repeating time periods. In addition, the trace collector 114 is configured to collect trace data during relatively longer time periods when the performance monitor 112 detects that the difference between a historical and a recent performance criteria value has met or exceeded a maximum performance criteria variability threshold value (or has met or fallen below a minimum performance criteria variability threshold value). The trace collector 114 can store the trace data collected over the relatively longer time period in, for example, a non-volatile memory for subsequent analysis.

Figure 2:
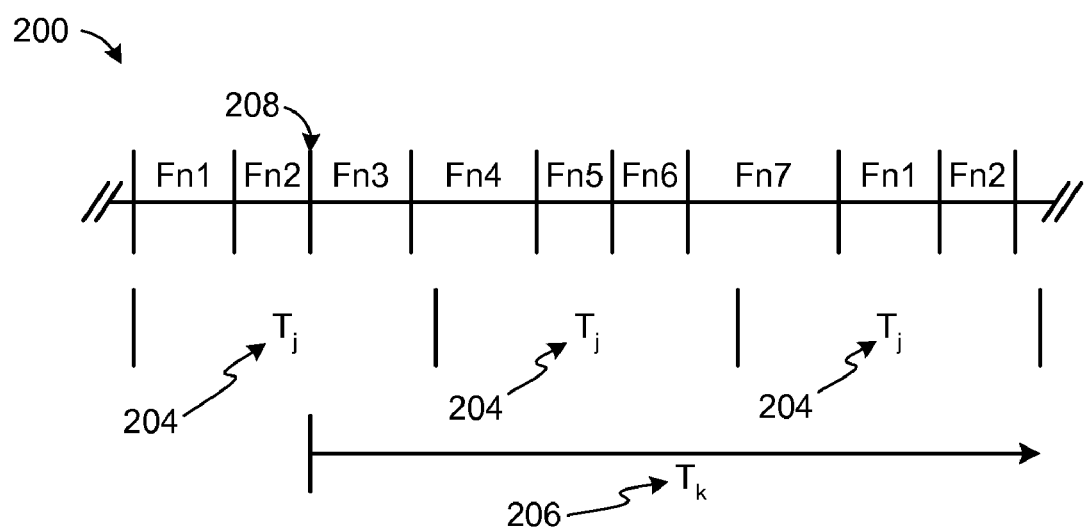
FIG. 2 is an example execution timeline showing a plurality of functions executed during a plurality of time periods associated with collecting trace data.

Turning briefly to FIG. 2, an execution timeline 200 shows a plurality of functions Fn1-Fn7 executed by the node A 102 in connection with the process A 108, a plurality of relatively short time periods 204, and a relatively long time period 206. Some or all of the functions Fn1-Fn7 may be executed one time or repeatedly executed multiple times. In the illustrated example, the functions Fn1 and Fn2 are shown as being executed two times. Although the functions Fn1-Fn7 are shown as a linear sequence of functions, in other example implementations, the function Fn1-Fn7 or other monitored functions may include nested functions that are called from within other functions and that return control to the calling functions before execution of a subsequent function. For example, in the illustrated example of FIG. 2, the function Fn1 may have an instruction that calls a function Fn10 (not shown), and when the function Fn10 finishes executing, the function Fn10 returns control to the calling function Fn1 before the function Fn2 is executed.

A user can specify the length of the time periods 204 and 206 during a configuration phase. In the illustrated example, the time periods 204 have a duration that spans a plurality of the functions Fn1-Fn7. During the time periods 204, the performance monitor 112 collects performance data associated with the functions Fn1-Fn7 and the trace collector 114 collects trace data associated with the functions Fn1-Fn7. At the end of each time period $T_j$ 204, the performance monitor 112 generates one or more recent performance criteria values for the recently executed functions (e.g., the functions Fn1, Fn2, and Fn3) based on the performance data collected during the time period 204. In the illustrated example, the performance monitor 112 can generate a recent performance criterion value for a software segment that contains one or more functions (e.g., one or more of the functions Fn1, Fn2, Fn3) or one or more processes or routines within a particular function. In some example implementations, the performance monitor 112 can generate the performance criterion values by, for example, averaging the performance data or using any other statistical processing technique to process the performance data.

Each of the functions Fn1-Fn7 is separated from a temporally neighboring or adjacent function by an exit/entry event such as, for example, the exit/entry event 208 separating the function Fn2 from the function Fn3. The exit/entry event 208 indicates a function exit point or event for the function Fn2 and a function entry point or event for the function Fn3. The trace collector 114 is configured to store information in association with collected trace data indicative of the occurrence of function exit events and/or function entry events (e.g., the exit/entry event 208) to, for example, facilitate analyzing the trace data to determine the functions with which the trace data is associated. In some example implementations, instead of generating the recent performance criteria values based on the expiration of the time period Tj 204, the performance monitor 112 may be configured to generate the performance criteria values in response to a function exit event (e.g., the exit/entry event 208).

The performance monitor 112 then determines a difference value or a standard deviation value indicative of a difference between the recent and historical performance criteria values corresponding to the function Fn2. To determine whether to collect trace data for a relatively longer time period (e.g., the time period 206), the performance monitor 112 compares the difference value to a threshold value specified by, for example, a user during a runtime configuration. If the difference value exceeds a maximum threshold value (or falls below a minimum threshold value), the performance monitor 112 copies any trace data collected thus far during a current one of the time periods 204 in a data structure or file (e.g., in a non-volatile memory) and causes the trace collector 114 to collect additional trace data during the time period 206 and store the collected trace data for subsequent analysis. In the illustrated example of FIG. 1, the performance monitor 112 sets a flag 118 to indicate that the performance monitor 112 has determined that the difference between a recent and a historical performance criteria value has exceeded (or fallen below) a threshold value (e.g., identified an abnormality in the performance of the process A 108) and that trace data associated with execution of the process A 108 should be collected for subsequent analysis.

As shown in FIG. 2, the time period 206 spans more of the functions Fn1-Fn7 than does each of the time periods 204. In this manner, trace data associated with one or more functions of interest (e.g., the function Fn2) is relatively more likely to be captured during the time period 206 when the functions Fn1-Fn7 are executed in a repeating or recursive fashion. In the illustrated example, if the function of interest is the function Fn2, the trace collector 114 collects trace data associated with the functions Fn1-Fn7 including trace data associated with at least one execution of the function of interest Fn2.

Returning to FIG. 1, to store the trace data collected by the trace collector 114 during each time period 204, the node A 102 is provided with a circular buffer 120. In addition, the performance monitor 112 is configured to store performance data collected during each time period 204 in the circular buffer 120.

Briefly referring to the blocks of the node B 104, the node B 104 includes a performance monitor 132, a trace collector 134, a historical performance data buffer 136, a flag 138, and a circular buffer 140, each of which is substantially similar or identical to a respective one of the performance monitor 112, the trace collector 114, the historical performance data buffer 116, the flag 118, and the circular buffer 120 of the node A 102.

Programmers are often interested in monitoring the performance of a distributed application that includes a plurality of processes (e.g., the application processes 108 and 110) executed by a plurality of network nodes. Some processes executed by particular network nodes may depend on information (e.g., variable values, messages, etc.) generated by processes executed by other network nodes. A network node may have to stall execution of its process until it receives such information from another network node, which may be executing a respective process, for example, relatively slower. In the illustrated example, to enable other nodes to monitor performance of its process execution, the node A 102 is provided with parallel performance indicators 142.

In the illustrated example, the parallel performance indicators 142 may be generated by the performance monitor 112 or a parallel performance daemon (not shown) and include performance information associated with execution of the application process 108. In some example implementations, the parallel performance indicators 142 include, for example, performance criteria values substantially similar or identical to those described above. Additionally, the parallel performance indicators 142 may include performance information indicative of the parallel execution performance of a distributed application. That is, the parallel performance indicators 142 may be used to quantify the parallel execution performance of a distributed application that includes a plurality of processes, each of which is executed by a different node. For example, in the illustrated example of FIG. 1, the application process A 108 and the application process B 110 may be processes of a distributed application, and the parallel performance indicators 142 may be used to monitor the performance of the application process A 108. To measure parallel execution performance, the parallel performance indicators 142 may include criteria indicative of, for example, load balance, stall time required to wait for inter-node messages, etc. In addition, the parallel performance indicators 142 may be used to measure the performance of inter-node communications using criteria indicative of, for example, message latency, asynchronous communication metrics (e.g., delay between data requests and data receipts), etc.

In the illustrated example, the node B 104 also includes parallel performance indicators 144. The nodes 102 and 104 can exchange one or more of the parallel performance indicators 142 and 144 via the network 106 using time stamped performance messages 146. In this manner, each of the parallel performance indicators 142 and 144 can analyze the performance information to determine whether another node is, for example, lagging in performance. The performance monitors 112 and 132 may be configured to analyze the received parallel performance indicators using, for example, techniques substantially similar or identical to those described above in connection with the historical and recent performance criteria values.

Based on the analysis of performance indicators from other nodes, each node can determine whether to request the other nodes to collect trace data associated with their executions of respective processes. If the performance monitor 112 determines that the node B 104 is lagging in performance, the performance monitor 112 communicates a trace on/off message 148 to the node B 104 to set the flag 138 of the node B 104 which, in turn, causes the trace collector 134 to collect trace data for a duration of time substantially similar or identical to the time period 206 of FIG. 1. The nodes 102 and 104 may be configured to use a message passing interface (MPI) protocol to communicate the messages 146 and 148 via the network 106. When two or more nodes are communicatively coupled and configured to execute related application processes (e.g., processes of a distributed application), a node that detects a performance lag in another node may be configured to broadcast the trace on/off message 148 to all other network nodes to cause all of the network nodes to collect trace data for a particular time period (e.g., the time period 206 of FIG. 2). To ensure that all or substantially all trace data of interest is saved, when a node receives a broadcasted trace on/off message 148, the receiving node is configured to determine the time at which the broadcasting node sent the trace on/off message 148 based on assumed or actual network communication delays (e.g., due to communication bitrate or other latency factors). The receiving node then uses the calculated sending time to determine the earliest, previously collected trace data that the node needs to copy from its circular buffer (e.g., the circular buffer 140 of FIG. 1) to its message trace (e.g., the message trace 164). To ensure that all trace data of interest is collected and stored, the receiving node may be configured to assume worst-case conditions (e.g., highest delay times, highly loaded network bus) when estimating the sending time of the trace on/off message 148. Thus, to ensure storing sufficient trace data associated with parallel performance monitoring, circular buffers used to monitor parallel execution performance can be configured to be relatively larger than circular buffers used for monitoring only local execution performance.

In the illustrated example, each of the nodes 102 and 104 includes a local clock (LCLK) 150 and 152, respectively, to provide the timestamps in the time stamped messages 146. Preferably, but not necessarily, each of the nodes 102 and 104 is configured to adjust its local clock 150 and 152 based on the timestamps in the time stamped performance messages 146 to substantially ensure that time-dependant information in the messages 146 is interpreted correctly by each of the nodes 102 and 104. For example, if one of the parallel performance indicators 142 in the time stamped performance message 146 indicates that the node A 102 is executing a particular function of the process A 108 at a particular time, the performance monitor 132 needs to be able to relatively accurately determine when the node A 102 was executing the particular function based on the time indicated by its own local clock 152. If the times of the local clocks 150 and 152 differ, the performance monitor 132 may incorrectly interpret the timestamps in the time stamped performance message 146.

In the illustrated example, the node A 102 embeds a sender timestamp derived from the local clock 150 in the time stamped performance message 146. After receiving the time stamped performance message 146, the node B 104 compares the sender timestamp (i.e., the received timestamp) with its local clock 152. If the sender timestamp is later than the current time of the local clock 152, the node B 104 adjusts its local clock 152 towards the sender timestamp received via the message 146. Alternatively, instead of adjusting the local clocks 150 and 152 based on sender timestamps, the nodes 102 and 104 may adjust global clocks 154 and 156, which the performance monitors 112 and 132 can use for parallel performance analyses.

For purposes of comparing the sender timestamp with the time of the local clock 152, the node B 104 is configured to account for the estimated transfer duration required to transmit the message 146 from the node A 102 to the node B 104. The estimated transfer duration can be determined by dividing the bit length of the message 146 by the bitrate of the network 106. Additionally or alternatively, the estimated transfer duration can be determined based on historical transfer durations. To take into account the transfer duration, the node B 104 compares the time of the local clock 152 with the sum of the sender timestamp and the transfer duration. If the time of the local clock 152 is less than the summed value and if the calculated transfer duration is less than or equal to a minimum transfer duration value (which may be specified by a user or determined based on historical transfer times), the node B 104 adjusts the local clock 152 (or the global clock 156) to have a time equal to the summed value.

During a postmortem merge process 162, the node A 102 communicates its collected trace data to the postmortem merge process 162 via a message trace 164 and the node B 104 communicates its collected trace data to the postmortem merge process 162 via a message trace 166. The message trace 164 contains trace data collected by the trace collector 114 in association with the execution of the functions Fn1-Fn7 of FIG. 2, and the message trace 166 contains trace data collected by the trace collector 134. The postmortem merge process 162 receives the message traces 164 and 166 and message traces from other network nodes and merges the trace data for subsequent analyses. In some example implementations, the nodes 102 and 104 can also communicate the message traces 164 and 166 to a dynamic trace processor 168 configured to analyze the collected trace data in real time.

Figure 3A:
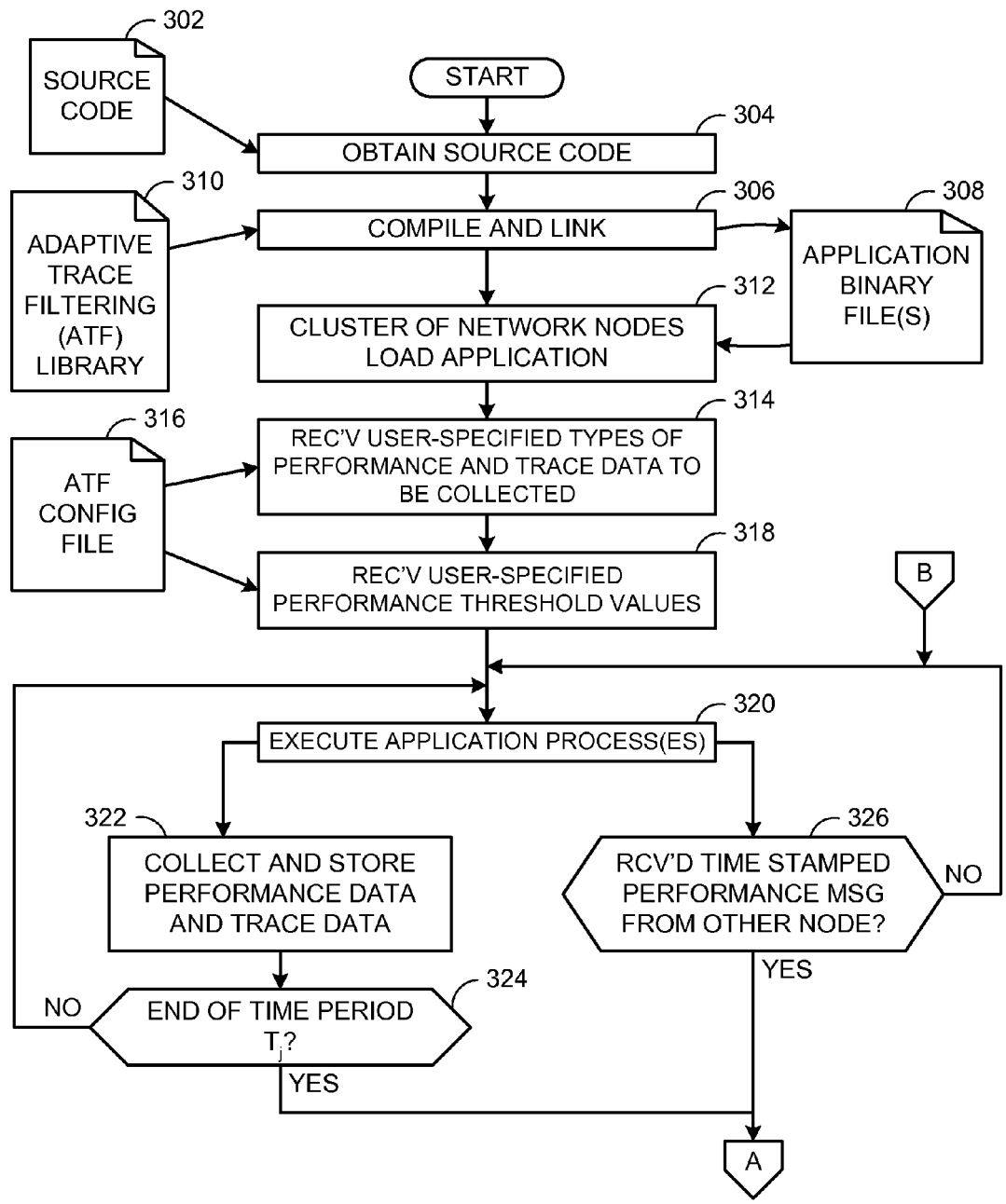
FIGS. 3A and 3B depict a flowchart representative of an example method that may be used to implement the example systems and apparatus of FIG. 1.
Figure 3B:
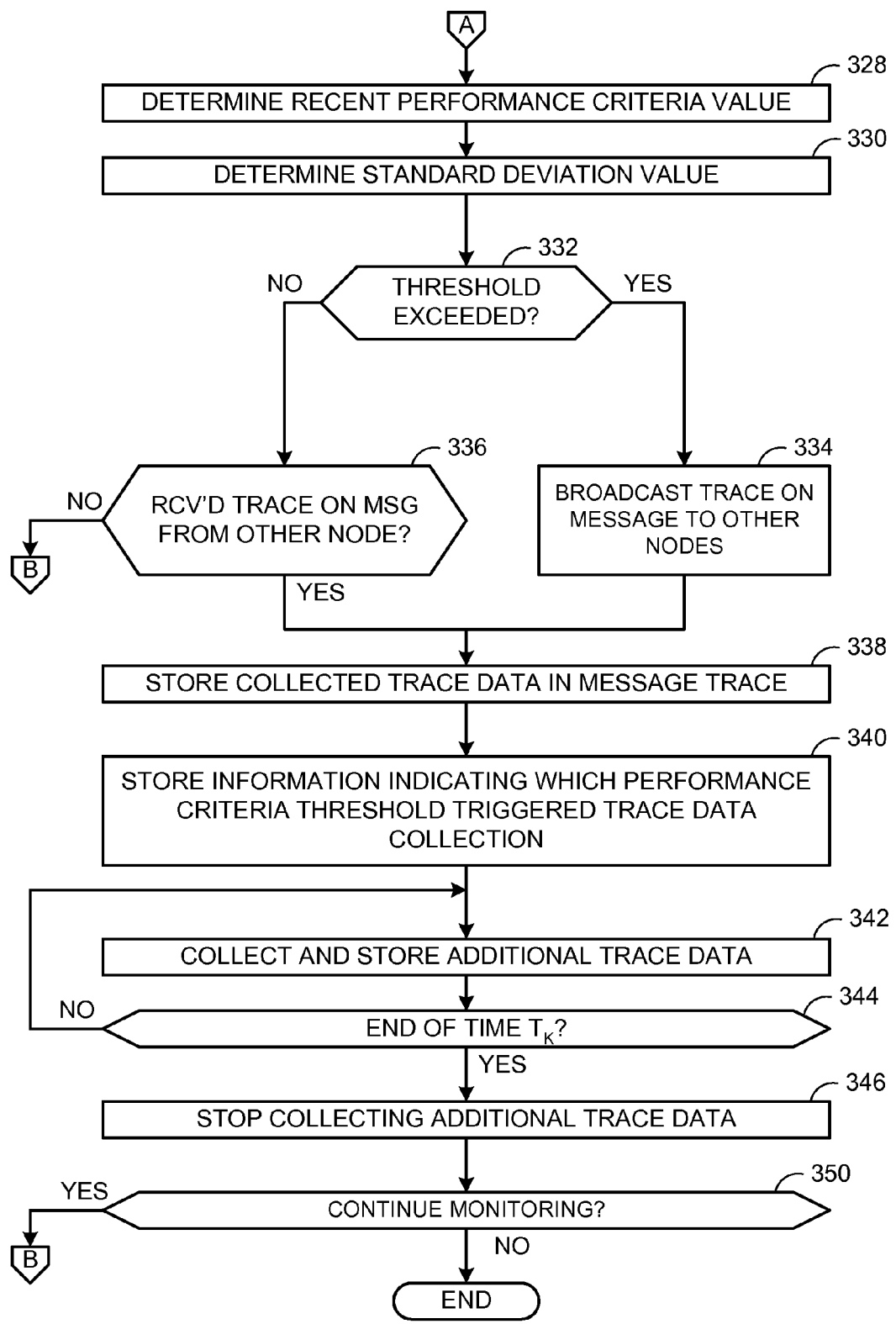

FIGS. 3A and 3B depict a flowchart representative of an example method that may be used to implement the example systems and apparatus of FIG. 1 to collect runtime trace data associated with application performance. In some example implementations, the example method of FIGS. 3A and 3B may be implemented using machine readable instructions comprising a program for execution by a processor (e.g., the processor 412 of FIG. 4). The program may be embodied in software stored on a tangible medium (e.g., a CD-ROM, a floppy disk, a hard drive, etc.) or a memory associated with the processor 412 and/or embodied in firmware and/or dedicated hardware in a well-known manner. Further, although the example program is described with reference to the flowchart of FIGS. 3A and 3B, persons of ordinary skill in the art will readily appreciate that many other methods of implementing the example systems and apparatus of FIG. 1 may alternatively be used. For example, the order of execution of the blocks may be changed, and/or some of the blocks described may be changed, eliminated, or combined. Further, operations of two or more blocks may be performed in parallel or serially.

Initially, a compiler obtains source code 302 (block 304) and compiles and links the source code 302 (block 306) to generate one or more application binary file(s) 308. In the illustrated example, the compiler imports trace data collection functions from an adaptive trace filtering (ATF) library 310, which enables the adaptive collection of trace data and the collection of performance data described above in connection with FIG. 1. A plurality of network nodes (or a cluster of network nodes) load respective ones of the application binary files 308 into their local memories (block 312). For example, in the illustrated example of FIG. 1, the node A 102 loads a binary file corresponding to the application process A 108.

The performance monitor 112 (FIG. 1) receives from, for example, an ATF configuration file 316, user-specified types (e.g., criteria types) of performance and trace data to be collected (block 314), user specified performance threshold values (e.g., criteria threshold values) (block 318), user-specified time periods 204 and 206 (FIG. 2), and/or any other user-specified information to implement adaptive or selective collection of trace data based on application performance. The node A 102 then executes the application process A 108 (block 320), and the performance monitor 112 collects performance data and trace data and stores the same in the circular buffer 120 (FIG. 1) (block 322) during the time periods $T_j$ 204 (FIG. 2) based on the types of performance and trace data received at block 314. While collecting and storing performance and trace data (block 322), the performance monitor 112 determines whether the time period $T_j$ 204 has expired (block 324). If the time period Tj 204 has not expired, the performance monitor 112 continues to collect and store performance and trace data and monitor for the expiration of the time period Tj 204 while the node A 102 continues to execute the process A 108.

Also, while collecting and storing performance and trace data (block 322), the performance monitor 112 determines whether it has received a time stamped performance message 146 from another node (block 326). When the performance monitor 112 does not receive a time stamped performance message 146 (block 326), the node A 102 continues to execute the process A 108 and the performance monitor 112 continues to monitor receipt of any time stamped performance messages 146 from other nodes (block 326) while it collects and stores performance data and trace data (block 322).

When the performance monitor 112 receives a time stamped performance message 146 from another node (block 326) or when the time period $T_j$ 204 has expired (block 324), the performance monitor 112 determines a recent performance criteria value (block 328) (FIG. 3B). The performance monitor 112 then generates a standard deviation value (or a difference value) (block 330) indicative of the deviation between the recent performance criteria value and a historical performance criteria value corresponding to the most recently executed function (e.g., the function Fn2 of FIG. 2 corresponding to the exit event 208 detected at block 324).

The performance monitor 112 then compares the standard deviation value to a corresponding threshold value to determine if the threshold has been exceeded (block 332). If the threshold has been exceeded (block 332), the parallel performance indicator 142 broadcasts the trace on message 148 to other nodes (block 334) such as, for example, the node B 104. If the threshold has not been exceeded (block 332), the performance monitor 112 determines whether it has received a trace on message 148 (FIG. 1) from another node (block 336). If the trace on message 148 has been received (block 336) or after the parallel performance indicator 142 broadcasts the trace on message 148 to other nodes (block 334), the trace collector 114 copies the trace data recently collected during the time period $T_j$ 204 from the circular buffer 120 and stores the same in the message trace 164 (FIG. 1) (block 338). In addition, the trace collector 114 stores information in the message trace 164 indicating which performance criteria threshold that has been exceeded (block 340). The information of the exceeded performance criteria threshold can facilitate subsequent analysis of the collected trace data. Also, the trace collector 114 collects additional trace data and stores the same in the message trace 164 (block 342) during the time period $T_k$ 206 (FIG. 2). The trace collector 114 continues to store and collect the additional trace data until the end of the time period $T_k$ 206 has been reached (block 344), at which point the trace collector 114 stops collecting the additional trace data (block 346). The performance monitor 112 then determines whether it should continue to monitor execution of the process A 108 (block 350). If the performance monitor 112 determines that it should continue to monitor execution of the process A 108 or if the performance monitor 112 determines that it has not received a trace on message from another node (block 336), control returns to block 320 to monitor execution of the process A 108. Otherwise, if the performance monitor 112 determines that it should not continue to monitor execution of the process A 108 (block 350), the example method of FIGS. 3A and 3B is ended.

Figure 4:
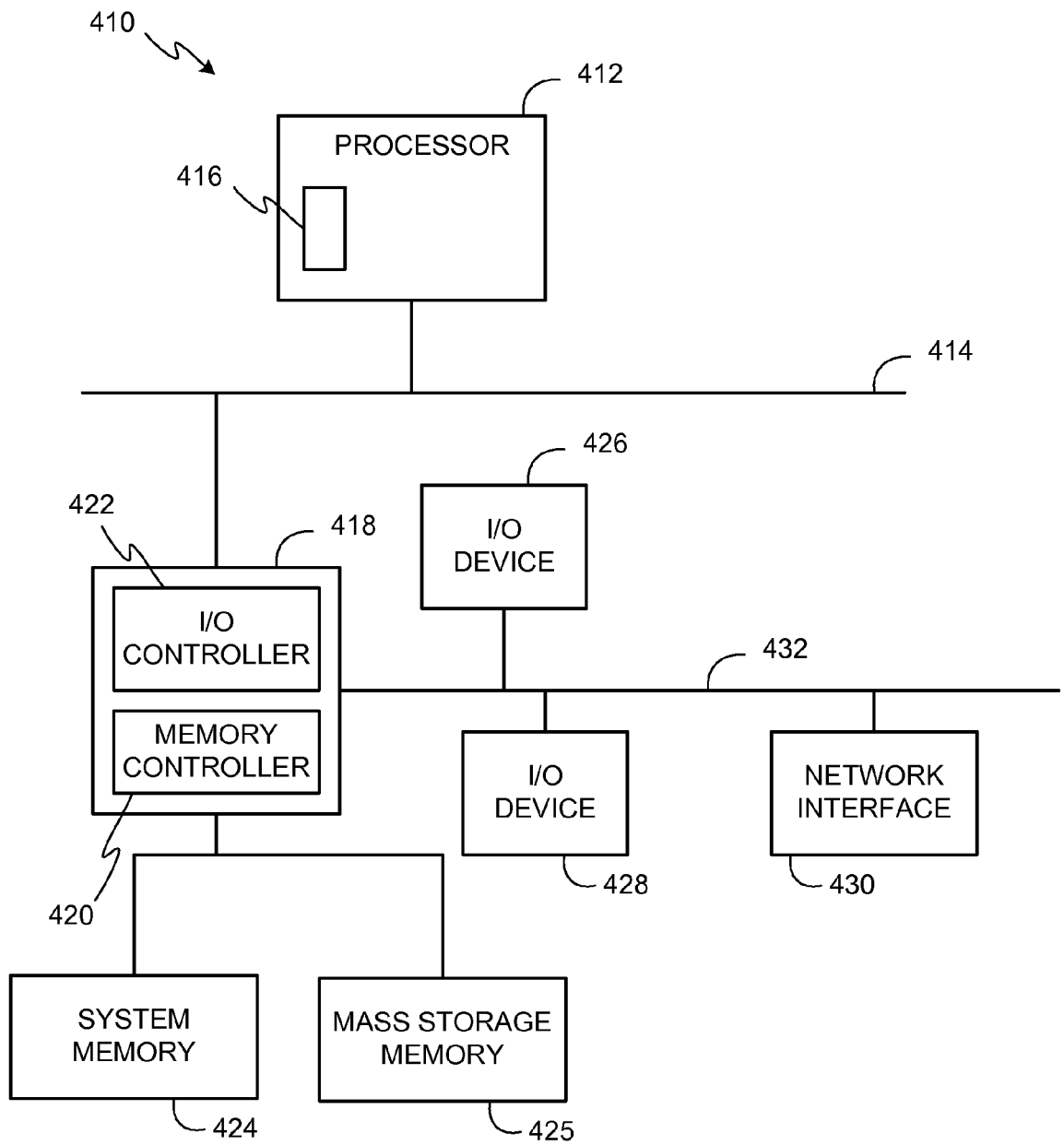
FIG. 4 is a block diagram of an example processor system that may execute the method represented by FIGS. 3A and 3B to implement the example systems and apparatus of FIG. 1.

FIG. 4 is a block diagram of an example processor system 410 that may execute the method represented by FIG. 4 to implement the example systems and apparatus of FIG. 1. As shown in FIG. 4, the processor system 410 includes a processor 412 that is coupled to an interconnection bus 414. The processor 412 may be any suitable processor, processing unit or microprocessor. Although not shown in FIG. 4, the system 410 may be a multi-processor system and, thus, may include one or more additional processors that are identical or similar to the processor 412 and that are communicatively coupled to the interconnection bus 414.

The processor 412 of FIG. 4 is coupled to a chipset 418, which includes a memory controller 420 and an input/output (I/O) controller 422. As is well known, a chipset typically provides I/O and memory management functions as well as a plurality of general purpose and/or special purpose registers, timers, etc. that are accessible or used by one or more processors coupled to the chipset 418. The memory controller 420 performs functions that enable the processor 412 (or processors if there are multiple processors) to access a system memory 424 and a mass storage memory 425.

The system memory 424 may include any desired type of volatile and/or non-volatile memory such as, for example, static random access memory (SRAM), dynamic random access memory (DRAM), flash memory, read-only memory (ROM), etc. The mass storage memory 425 may include any desired type of mass storage device including hard disk drives, optical drives, tape storage devices, etc. The I/O controller 422 performs functions that enable the processor 412 to communicate with peripheral input/output (I/O) devices 426 and 428 and a network interface 430 via an I/O bus 432. The I/O devices 426 and 428 may be any desired type of I/O device such as, for example, a keyboard, a video display or monitor, a mouse, etc. The network interface 430 may be, for example, an Ethernet device, an asynchronous transfer mode (ATM) device, an 802.11 device, etc. that enables the processor system 410 to communicate with other processor systems. While the memory controller 420 and the I/O controller 422 are depicted in FIG. 4 as separate functional blocks within the chipset 418, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method, comprising:
receiving a first performance value from a first network node based on first performance data associated with a first function of a first application process;
collecting second performance data via a second network node;
generating a historical performance value via the second network node based on the second performance data;
generating via the second network node a difference value based on the first performance value and the historical performance value;
comparing via the second network node the difference value to a threshold value; and based on the comparison of the difference value to the threshold value, sending a message to the first network node to collect first trace data associated with execution of the first application process.

2. A method as defined in claim 1, wherein the first performance data is associated with an execution of the first function and is determined based on a value associated with the first performance data.

3. A method as defined in claim 1, further comprising generating the historical performance value based on performance data associated with executing the first function a plurality of times at the second network node prior to receiving the first performance value.

4. A method as defined in claim 1, further comprising, prior to sending the message to the first network node to collect the first trace data, receiving the first performance value and other trace data associated with an execution of the first function for a first predetermined duration of time and the first trace data to be collected for a second predetermined duration of time.

5. A method as defined in claim 1, wherein each of the first performance value and the historical performance value comprises a cycles per instruction value, a memory bandwidth value, a cache miss rate value, or a rate of context switches value.

6. A method as defined in claim 1, wherein the first trace data includes at least one of a cycles per instruction value, a memory bandwidth value, a cache miss rate value, or a rate of context switches value.

7. A method as defined in claim 1, wherein the first performance value is generated in response to an exiting of the first function.

8. A method as defined in claim 1, wherein the first performance data is associated with the first function executing on a plurality of network nodes.

9. A method as defined in claim 8, wherein the first performance data is collected during runtime.

10. A method as defined in claim 1, wherein the historical performance value is associated with the first function executing on a plurality of network nodes.

11. A method as defined in claim 1, wherein the first performance data is collected during runtime.

12. A method as defined in claim 1, wherein comparing the difference value to the threshold value is performed during runtime.

13. A method as defined in claim 1, wherein knowledge of operation of other application processes is not used in generating the difference value.

14. A machine accessible medium having instructions stored thereon that, when executed, cause a machine to at least:

receive a first performance value associated with a first function of a first application process at a first network node;

generate a historical performance value associated with a second network node;

generate a difference value based on the first performance value and the historical performance value;

compare the difference value to a threshold value; and instruct the first network node to collect first trace data associated with execution of the first application process based on the comparison of the difference value to the threshold value.

15. A machine accessible medium as defined in claim 14, wherein the first performance data is associated with an execution of the first function and is determined based on a value associated with the first performance data.

16. A machine accessible medium as defined in claim 14 having instructions stored thereon that, when executed, cause the machine to generate the historical performance value based on performance data associated with executing the first function a plurality of times prior to receiving the first performance value.

17. A machine accessible medium as defined in claim 14 having instructions stored thereon that, when executed, cause the machine to collect other trace data associated with an execution of the first function for a first predetermined duration of time prior to collecting of the first trace data and to instruct the first network node to collect the first trace data for a second predetermined duration of time.

18. A machine accessible medium as defined in claim 14, wherein each of the first performance value and the historical performance value comprises a cycles per instruction value, a memory bandwidth value, a cache miss rate value, or a rate of context switches value.

19. A machine accessible medium as defined in claim 14, wherein the first trace data includes at least one of a cycles per instruction value, a memory bandwidth value, a cache miss rate value, or a rate of context switches value.

20. A machine accessible medium as defined in claim 14, wherein the first performance value is generated in response to an exiting of the first function.

21. A machine accessible medium as defined in claim 14, wherein the first performance value is associated with the first function executing on a plurality of network nodes.

22. A machine accessible medium as defined in claim 21, wherein the first performance value is based on first performance data collected during runtime of the first function.

23. A machine accessible medium as defined in claim 14, wherein the historical performance value is associated with the first function executing on a plurality of network nodes.

24. A machine accessible medium as defined in claim 14, wherein the first performance value is based on first performance data collected during runtime of the first function.

25. A machine accessible medium as defined in claim 14, wherein comparing the difference value to the threshold value is performed during runtime.

26. A machine accessible medium as defined in claim 14, wherein knowledge of operation of other application processes is not used in generating the difference value.

* * * * *